United States Patent
Troy et al.

(10) Patent No.: US 11,769,039 B2
(45) Date of Patent: *Sep. 26, 2023

(54) SYSTEM FOR DETERMINING THE PRESENCE OF A SUBSTANCE OF INTEREST IN A SAMPLE

(71) Applicant: Smiths Detection, Inc., Edgewood, MD (US)

(72) Inventors: Jerome Troy, Newark, DE (US); John W. Edwards, Frederick, MD (US); Heather Goldman, Westminster, MD (US); David Joiner, Edgewood, MD (US); William Miller, Boyds, MD (US)

(73) Assignee: Smiths Detection, Inc., Edgewood, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,256

(22) Filed: Jul. 5, 2022

(65) Prior Publication Data
US 2023/0004784 A1 Jan. 5, 2023

Related U.S. Application Data

(63) Continuation of application No. 16/635,633, filed as application No. PCT/US2018/044574 on Jul. 31, 2018, now Pat. No. 11,379,709.

(Continued)

(51) Int. Cl.
*G06N 3/045* (2023.01)
*G06N 3/08* (2023.01)
(Continued)

(52) U.S. Cl.
CPC ............ *G06N 3/045* (2023.01); *G06N 3/08* (2013.01); *H01J 49/0036* (2013.01); *H01J 49/025* (2013.01)

(58) Field of Classification Search
CPC ........ G06N 3/0454; G06N 3/08; G06N 3/084; H01J 49/0036; H01J 49/025; G01N 21/65;
(Continued)

(56) References Cited

U.S. PATENT DOCUMENTS

| 5,247,584 A | 9/1993 | Krogmann |
| 2002/0123977 A1 | 9/2002 | Raz |

(Continued)

FOREIGN PATENT DOCUMENTS

| CA | 2338675 A1 | 2/2000 |
| EP | 3151164 A2 | 4/2017 |

(Continued)

OTHER PUBLICATIONS

Dutta, Sibasish, et al., "Dye-Assisted pH Sensing Using aSmartphone," IEEE Photonics Technology Letters, vol. 27, No. 22, Nov. 15, 2015, pp. 2363-2366.

(Continued)

*Primary Examiner* — Christopher Wait
(74) *Attorney, Agent, or Firm* — Kevin E. West; Advent, LLP

(57) ABSTRACT

A detection device for detecting the presence of a substance of interest in a sample is described. The device can include a data store comprising executable instructions for at least one convolutional neural network, CNN, configured to process images: and a processor coupled to the data store and configured to execute the instructions to operate the at least one CNN. The detection device can be configured to: obtain spectrometry data, operate a first one of the CNNs to process the spectrometry data to obtain a first CNN output; apply a mask to the spectrometry data to obtain masked data; operate a second one of the CNNs to process the masked data to obtain a second CNN output; and determine if the substance of interest is present in the sample based on both the first CNN output and the second CNN output.

19 Claims, 7 Drawing Sheets

Related U.S. Application Data

(60) Provisional application No. 62/539,167, filed on Jul. 31, 2017.

(51) Int. Cl.
 *H01J 49/00* (2006.01)
 *H01J 49/02* (2006.01)

(58) Field of Classification Search
 CPC ... G01N 2021/3595; G01N 2201/1296; G01N 21/31
 See application file for complete search history.

(56) References Cited

U.S. PATENT DOCUMENTS

| | | |
|---|---|---|
| 2014/0376824 A1 | 12/2014 | Levenson et al. |
| 2016/0180195 A1* | 6/2016 | Martinson ........... G06F 18/2431 382/103 |
| 2017/0178346 A1* | 6/2017 | Ferro ..................... G06N 3/084 |
| 2017/0191948 A1 | 7/2017 | Gao et al. |
| 2018/0082172 A1* | 3/2018 | Patel ....................... G06N 3/08 |

FOREIGN PATENT DOCUMENTS

| | | |
|---|---|---|
| WO | 0247017 A1 | 6/2002 |
| WO | 2016145379 A1 | 9/2016 |

OTHER PUBLICATIONS

Extended Search Report for European Application No. 18841659.8, dated Mar. 12, 2021.

International Search Report and the Written Opinion for Application No. PCT/US2018/044574, dated Nov. 16, 2018, 13 Pages.

Mei, Shaohui, et al., Learning Sensor-Specific Spatial-Spectral Features of Hyperspectral Images via Convolutional Neural Networks, IEEE Transactions on Geoscience and Remote Sensing, vol. 55, No. 8, Aug. 2017, pp. 4520-4533.

* cited by examiner

US 11,769,039 B2

SYSTEM FOR DETERMINING THE PRESENCE OF A SUBSTANCE OF INTEREST IN A SAMPLE

RELATED APPLICATIONS

This application claims domestic priority under 35 U.S.C. § 119(e) and/or PCT Article 8 to U.S. Provisional Application No. 62/539,167, filed Jul. 31, 2017. The contents of U.S. Provisional Application No. 62/539,167 are hereby incorporated by reference thereto (e.g., under 37 CFR § 1.57 and/or PCT Rule § 4.18), where permitted.

TECHNICAL FIELD

The present invention relates to apparatus and methods, and more particularly to apparatus and methods for determining the presence of a substance of interest in a sample.

BACKGROUND

Spectrometers may be used to provide data associated with the behaviour of a sample under certain conditions. For example, a mass spectrometer may provide an electric and magnetic field to influence the trajectory of particles. By measuring these trajectories a mass spectrometer is able to determine a mass-to-charge ratio for the species of ion in a sample. Other spectrometry methods measure different parameters. For example, time of flight ion mobility spectrometers (IMS) provide an indication of the ion mobility of ion species in a sample. Differential IMS devices provide an indication of field dependent ion mobility. Raman spectroscopy measures the frequency shift between incident and scattered electromagnetic radiation caused by interaction of that radiation with a sample. Many other types of spectrometry exist and can be used to identify the component substances in a sample. When generating data for a sample, there may be a large number of component substances in the sample. This in turn may provide a vast quantity of data, which will also include noise from the measurement equipment.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

A detection network device for detecting the presence of a substance of interest in a sample is described in accordance with an example embodiment of the present disclosure. In embodiments, the detection network device comprises: one or more detection devices; a data store comprising executable instructions for at least one convolutional neural network ("CNN"), configured to process images; and a processor coupled to the data store and configured to execute the instructions to operate the at least one CNN. In embodiments, the detection device may be in the form of a spectrometer. The spectrometer can generate an array of data over a particular spectra (e.g., light, mass, momentum, or energy). The array data for a spectrum may, for example, be representative of any of the following types of spectra: Mass spectra, Raman, Optical (e.g. infrared/ultraviolet/visible), Fourier Transform Infrared (FTIR), Ion Mobility Spectrometry (IMS), Radiological, Biological Agent, or any other suitable array data.

In embodiments, the detection network device is configured to: obtain spectrometry data, wherein the spectrometry data is arranged in at least one two dimensional array; operate a first one of the CNNs to process the spectrometry data to obtain a first CNN output; apply a mask to the spectrometry data to obtain masked data; operate a second one of the CNNs to process the masked data to obtain a second CNN output; and determine if the substance of interest is present in the sample based on both the first CNN output and the second CNN output.

The detection device may provide for improved analysis of spectrometry data. This may be in the form of a quicker analysis, or a more accurate analysis. For instance, well-trained CNNs may be able to identify patterns in spectrometry data which may otherwise go unnoticed. The CNNs are trained using spectrometry data with expected outcomes for that spectrometry data. The CNNs may therefore develop functionality to identify features in an item of spectrometry data which they associate with the substance of interest being present or not. These features may include any of a number of features of an item of spectrometry data. For example, they may not be limited simply to comparing peaks in a sample spectrum to peaks in known spectrum data.

Example Implementations

Figure 1A:
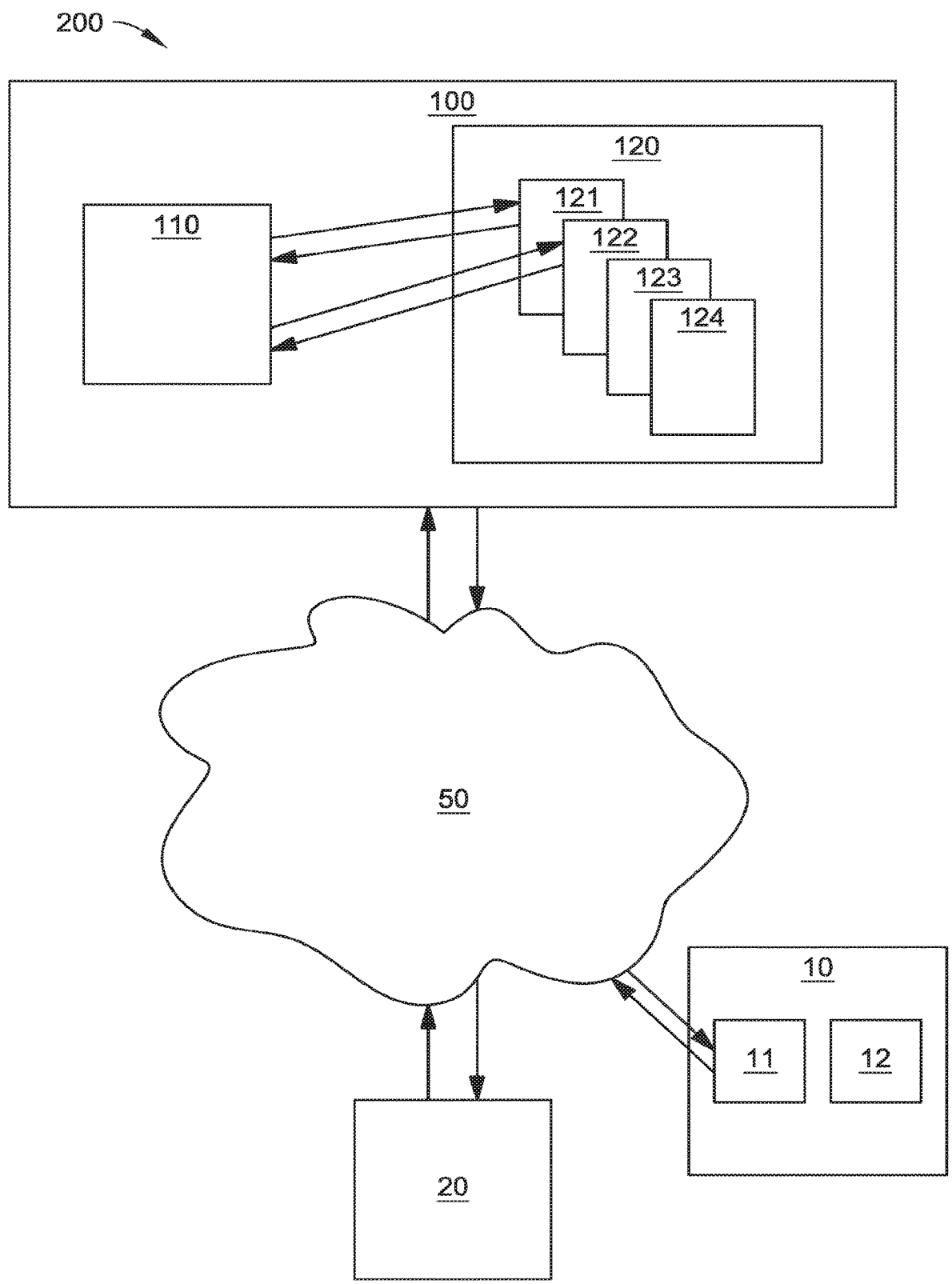
FIG. 1A is a schematic block diagram illustrating a network system for determining the presence of a substance of interest in a sample, in accordance with an example embodiment of the present disclosure.

FIG. 1A shows a detection network system 200 for determining the presence of a substance of interest in a sample.

The detection network system 200 includes a server 100 configured to receive data representative of a sample, such as from a spectrometer 10, 20. This data may be in a selected image format, or the server 100 may convert the data into the selected image format. The server 100 analyses the image data (representative of the sample) using a convolutional neural network ('CNN'). The server 100 comprises a plurality of suitable CNNs, each of which has been trained using images, in the selected image format, which are representative of a sample for which the presence of the substance of interest is known. Each CNN may therefore be able to determine if time substance of interest is present in a sample based on an analysis of image data, in the suitable image format, representative of the sample. The system may be further configured to apply a mask to the image data so that a portion of the image data is obscured and/or has its intensity reduced before the analysis of the image data by the CNN. The server 100 may determine the presence of the substance of interest based on both an analysis of image data and an analysis of the image data with a mask applied to it.

FIG. 1A shows an embodiment of a network detection system 200 including a first detection device 10 (e.g., a first spectrometer), a second detection device 20 (e.g., a second spectrometer), a network 50, and a server 100. The first detection device 10 can comprise a communication device 11 and a detector 12. The server 100 can comprises a processor 110 and a data store 120. In embodiments, the server 100 is connected to the first and second detection devices over the network 50. The data store 120 stores executable instructions for at least one CNN, such as: first CNN 121, second CNN 122, third CNN 123 and fourth CNN 124. The instructions may be stored on a volatile and/or non-volatile memory of the data store 120. The processor 110 is coupled to the data store 120 so that it may execute the instructions to operate each of: the first CNN 121, the second CNN 122, the third CNN 123 and the fourth CNN 124. Alternatively, the first detection device 10 and/or the second detection device 20 may be integrally connected (e.g., directly connected instead of via a network) with the server 100.

The server 100 of FIG. 1A may therefore receive an item of array data from the first detection device 10. The processor 110 of the server 100 is configured to process this array data to obtain an item of spectrometry data which may be analysed using one of the CNNs. The processor 110 then operates a CNN to determine a first analysis of the spectrometry data. This provides a first indication of the presence of the substance of interest in the sample. The processor 110 then applies a mask to the spectrometry data and operates a CNN to perform a second analysis of the masked image. This provides a second indication of the presence of the substance of interest in the sample. The processor 110 then determines if the substance of interest is present in the sample based on both the first and second indication of the substance of interest being present.

Figure 1B:
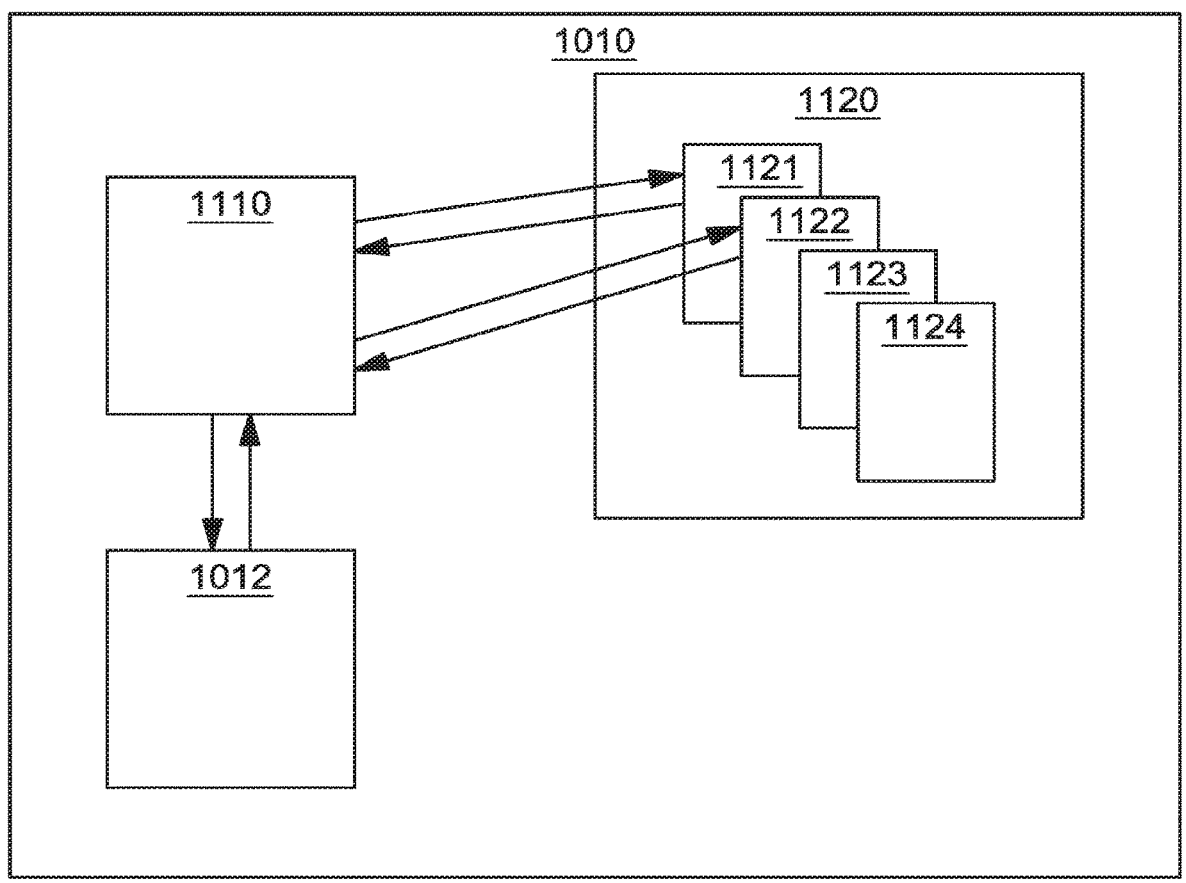
FIG. 1B is a schematic block diagram illustrating a detection device for determining the presence of a substance of interest in a sample.

FIG. 1B shows a detection device 1010 for detecting the presence of a substance of interest in a sample. The device 1010 is operable to both obtain array data (e.g. using a detector to generate measurements of the sample), and to use the above-described CNN analysis to determine the presence of the substance of interest.

The device 1010 comprises a processor 1110, a detector 1012 and a data store 1120. In an embodiment, the components of the device 1010 may be integrally coupled (e.g., hardwired). The data store 1120 stores executable instructions for at least one CNN, such as: first CNN 1121, second CNN 1122, third CNN 1123 and fourth CNN 1124. The instructions may be stored on a volatile and/or non-volatile memory of the data store 1120, The processor 1110 is coupled to the data store 1120 so that it may execute the instructions to operate each of: the first CNN 1121, the second CNN 1122, the third CNN 1123 and the fourth CNN 1124. The processor 1110 is coupled to the data store 1120 so that the processor 1110 may operate each of the CNNs. The processor 1110 may also be coupled to the data store 1120 so that the processor 1110 may modify each of the CNNs. The processor 1110 is also coupled to the detector 1012.

In operation, the detector 1012 is operable to obtain array data for a sample. For instance the detector 1012 may comprise any suitable form of spectrometer, such as a mass spectrometer, an IMS, etc. The processor 1110 is coupled to the detector 1012 so that the detector 1012 may communicate array data representative of the sample to the processor 1110. The processor 1110 is then configured to process the array data to obtain spectrometry data comprising an image which is suitable for analysis using one of the plurality of CNNs. The processor 1110 may then operate at least one of the CNNs to analyse the spectrometry data, and based on the analysis, to determine the presence of the substance of interest in the sample.

The processor 110 is coupled to the data store 120 so that the processor 110 may operate each of the CNNs. The processor 110 may also be coupled to the data store 120 so that the processor 110 may modify each of the CNNs. Each CNN is configured to operate on image data to determine a result for an attribute of the image data. This attribute is used when determining, the presence of the substance of interest in a sample. Operating a CNN comprises using the functionality of the CNN, and providing it with input data which the CNN is configured to analyse. The functionality of a CNN is based on a plurality of programmed operators, each of which processes a portion of the input data according to logical or mathematical instructions. Each operator may receive a plurality of portions of the input data, each of which is attributed a weighting to scale the relative contribution of the different portions of input. Modifying a CNN, or the executable instructions for a CNN, may comprise changing one or more of such weightings.

The communication device 11 of the first detection device 10 is configured to communicate with the server 100 over the network 50. Communication may be in the form of the sending and receiving of network messages. The server 100 may be connected to a plurality of other detection devices, such as second detection device 20, each of which is configured to use the server 100 to determine the presence of a substance of interest in a sample. The first detection device 10 comprises a detector 12. It is to be appreciated in the context of this disclosure that the detector 12 could be any suitable device for generating array data representative of a sample. The detector 12 may be any type of spectrometer, for example, it may be a mass spectrometer, an ion mobility spectrometer ('IMS'), an optical spectrometer such as a Fourier transform infrared spectrometer etc.

The processor 110 is configured so that processing array data to obtain image data to be analysed by the CNN comprises processing a spectrum which has input values for a variable (e.g. x-axis values) spanning a range X, and converting it into image data so that the entire range X is included. Alternatively, a set range may be specified, or a threshold criterion for minimum range may be implemented. Depending on the size of the range X, the spectrum may be inserted into one or more images comprised in the image data. The image comprises a two dimensional array of size a×h pixels. The processor 110 is configured to process the array data so that in an image suitable for analysis by a CNN, with progression horizontally across the image, e.g. from left to right, each pixel represents a corresponding point or region for the input values for the variable (e.g. a point on the x axis). In some embodiments, at each horizontal location in the image there could be a plurality of pixels extending vertically which represent the same corresponding point or region of the input values for the variable. In other embodiments, each horizontal location in the image may be one pixel, and that one pixel represents the corresponding point or region of the input values for the variable, in which case a numerical matrix for the two-dimensional array may translate directly into an image representing the two-dimensional array.

The processor 110 is configured so that an attribute of each pixel in an image represents an indication of a characteristic or value for the region/point of input values which that pixel corresponds to. For instance, the color and/or intensity of each pixel in the obtained image data may represent the value of the spectrum at that point or region of the x axis. The color and/or intensity may also be used to represent the rate of change of that value at that point or region in the spectrum. For example, the processor 110 may be configured to process the array data so that the largest values in the array data (i.e. those corresponding to peaks when viewed on a graph) are represented by pixels with the highest intensity. Alternatively, the color of a pixel may represent the size of the value. For example, a black pixel may represent a very low value, and as the pixel color progresses through a range of colors to white (e.g. purple, blue, green, yellow, red), the color represents a higher value for that point in the spectrum.

In the event that the range X is greater than a threshold value, the processor 110 may be configured to fold the spectrum into a plurality of rows in the two dimensional array. In Which case, a first row (e.g. the top row) may represent a first portion of the spectrum. Each subsequent row may represent a subsequent portion of the spectrum. For each row, each horizontal increment represents an increment along that portion of the x axis of the spectrum. In some embodiments, for each horizontal pixel in a row, all of the corresponding vertical pixels within that row represent the same portion of the spectrum. This may enable the processor 110 to process array data to obtain more feature-dense images, as each point or location on a conventional spectrum is represented by a region of pixels in the image. In some embodiments, each row has a height of one pixel and so each pixel may represent a portion of the spectrum. The processor 110 is thus configured to process array data for a spectrum to obtain an image in the form of a two dimensional array, which contains features in both the horizontal and vertical directions. These features in the image represent features of the spectrum.

Figure 2A:
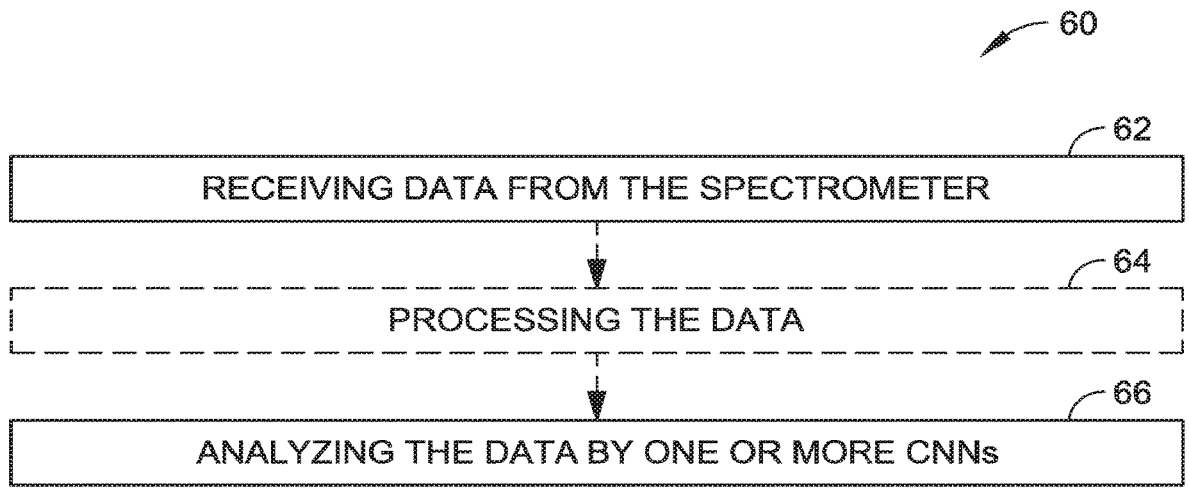
FIG. 2A is a flow chart illustrating an operational process of the detection network system, in accordance with an example embodiment of the present disclosure.

The operational process 60 of the network system 200, as shown in flowchart form in FIG. 2A, can generally include the steps of receiving data from the spectrometer 62, processing the data 64, and analyzing the data by one or more of CNNs 66. In step 62, the server 100 receives data from the first detection device 10 over the network 50. This may comprise obtaining data in the form of spectrometry data in a suitable image format to be analysed, at step 66, by one of the plurality of CNNs. Alternatively, this data may be in the form of array data representing a spectrum for a sample. In the latter case, the processor 110 is configured to process, via step 64, the array data to obtain spectrometry data in a suitable image format to be analysed, at step 66, by one of the plurality of CNNs. Spectrometry data comprises image data comprising at least one image in the form of a 2 dimensional array. Processing the array data comprises converting, translating and/or transforming the array data representing the spectrum into a matrix. For example, the matrix may represent the image, such as the pixels in the image. The processor 110 is configured so that the processed image comprises a significant number of "visual" features. It is these features that make up a unique signature for a sample, which are to be learned and/or processed by the CNN. The data processing step 64, per the above discussion, may be optional if the data is received in a format from step 62 that can be directly analyzed by the CNN.

Figure 2B:
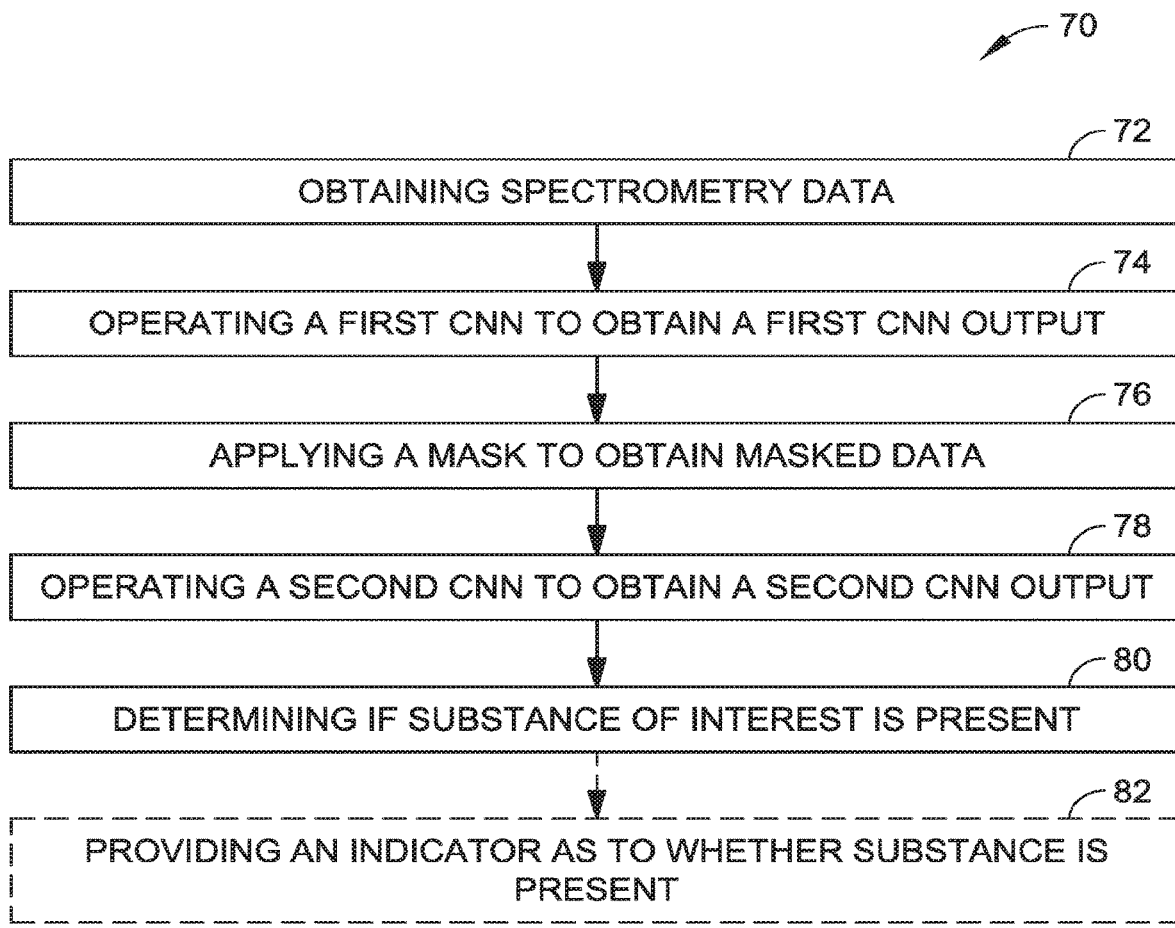
FIG. 2B is a flow chart illustrating a computer-implemented method of analyzing a spectrometry image to determine the presence of a substance of interest in a sample, in accordance with an example embodiment of the present disclosure.

In an aspect there is provided a computer-implemented method 70, as illustrated in the flow chart shown in FIG. 2B, of analyzing spectrometry image to determine the presence of a substance of interest in a sample. The method 70 comprises: obtaining spectrometry data (Step 72), wherein the spectrometry data is arranged in at least one two dimensional array operating a first convolutional neural network, CNN, to process the spectrometry data to obtain a first CNN output (Step 74); applying a mask to the spectrometry data to obtain masked data (Step 76); operating a second CNN to process the spectrometry data to obtain a second CNN output (Step 78); determining if the substance of interest is present in the sample based on both the first CNN output and the second CNN output (Step 80); and, optionally, providing an indicator (e.g., an audio and/or visual alert or message) as to whether the substance of interest is present in the sample (Step 80).

Figure 2C:
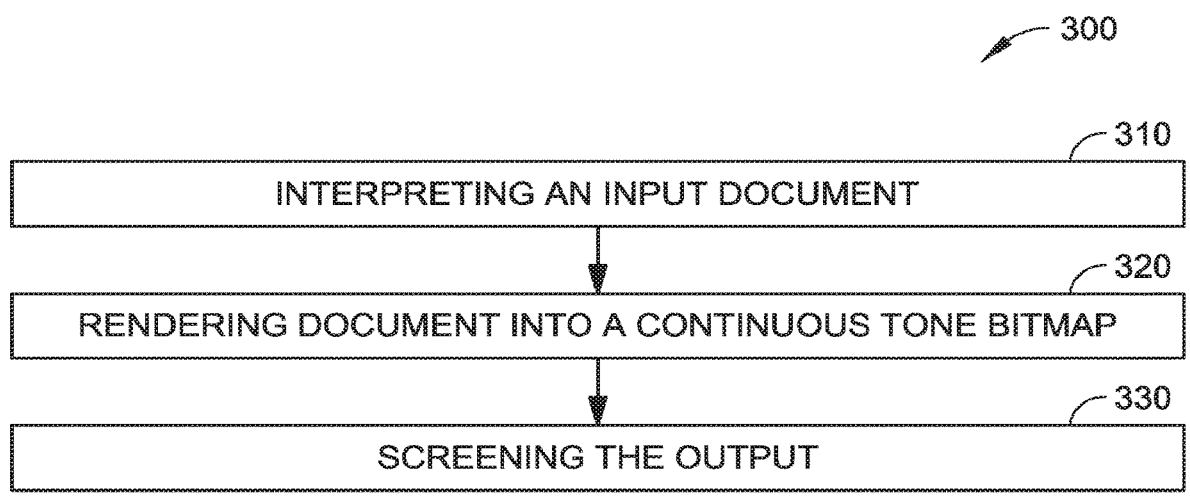
FIG. 2C is a flow chart illustrating a raster image generation process, in accordance with an example embodiment of the present disclosure.
Figure 2D:
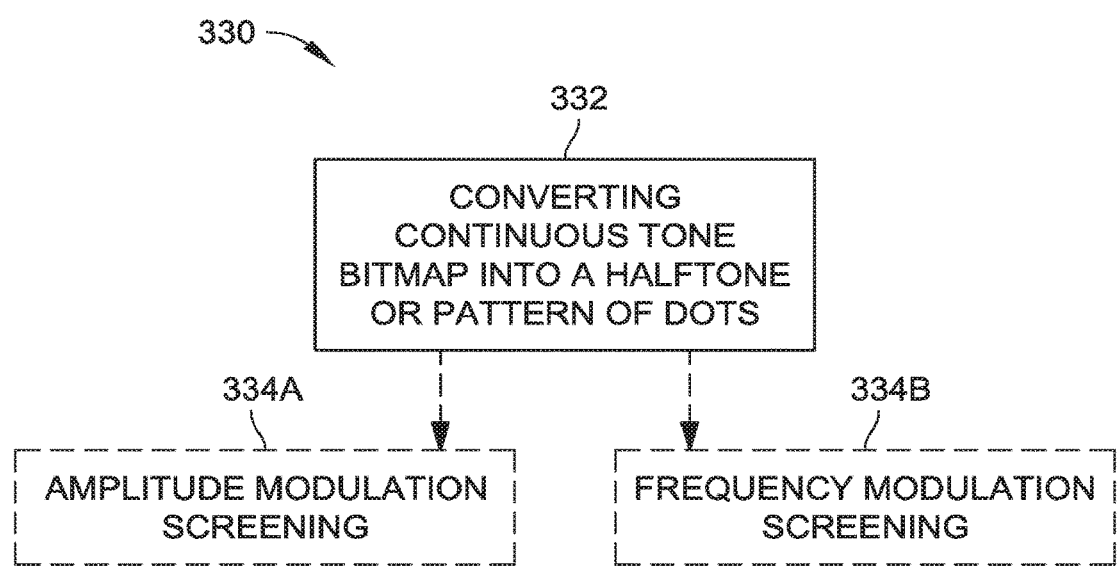
FIG. 2D is a flow chart illustrating a pair of screening step options for the raster image generation process shown in FIG. 2C.

This process may comprise using a raster image generation process 300, as shown in FIG. 2C. A raster image generation process 300 may comprise interpreting an input document (Step 310), rendering the document, e.g., into a continuous tone bitmap (Step 320), and screening the output (Step 330). Screening step 330, as shown in FIG. 2D), may comprise converting a continuous tone bitmap into a half-tone or pattern of dots (Sub-Step 332), followed by either amplitude modulation screening (Sub-Step 334A) or frequency modulation screening (Sub-Step 334B). Such raster image processing 300 may be implemented either in software, hardware, or a combination thereof. It is to be appreciated in the context of this disclosure that any other suitable process for converting array data representing a spectrum into an image with suitable visual features indicative of the spectrum may also be used.

Figure 3:
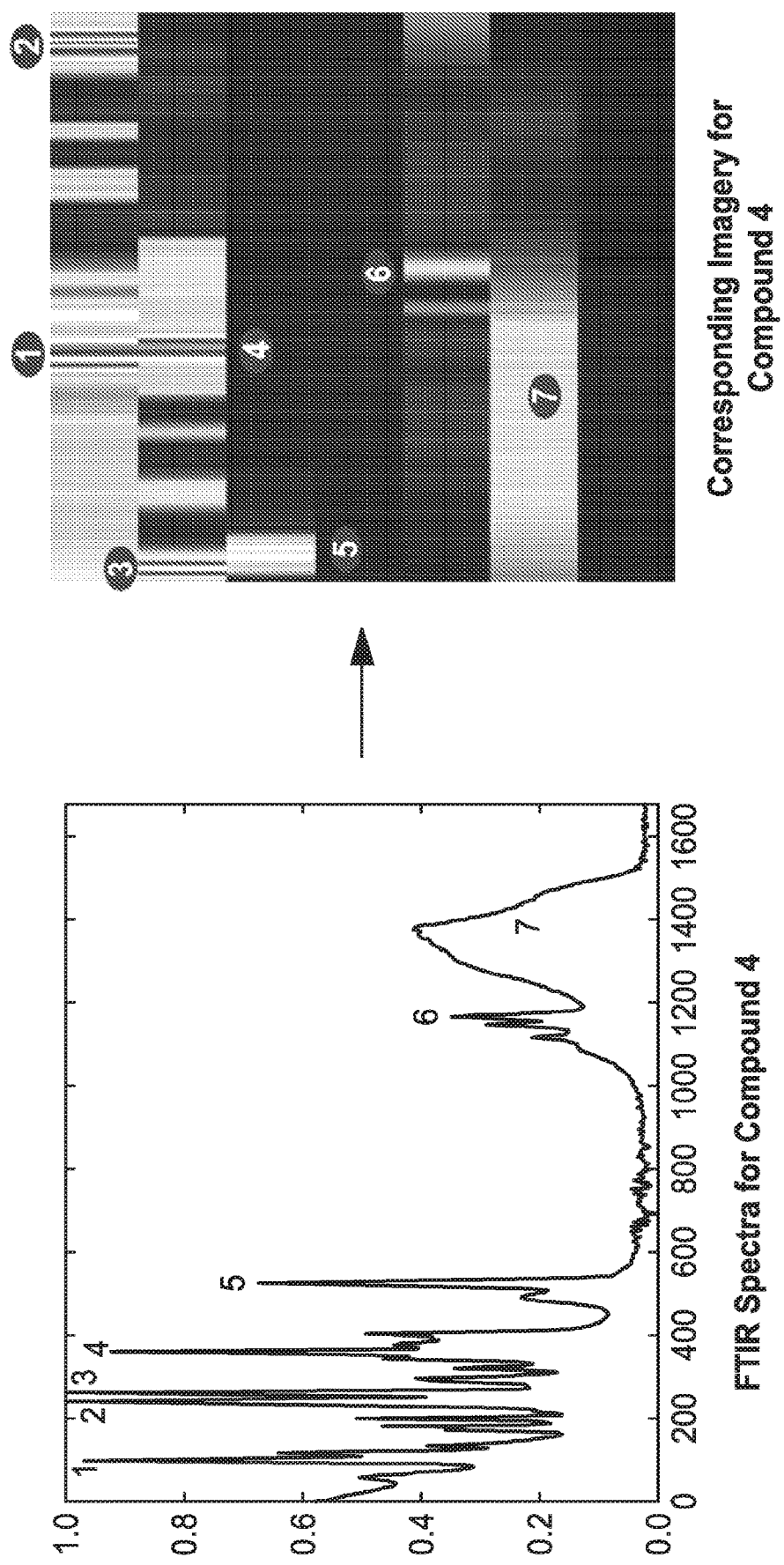
FIG. 3 is a chart illustrating possible results from an example conversion from array data into an image comprising a two dimensional array.

As illustrated in FIG. 3 (shown in gray scale), an FTIR spectrum is converted to an image suitable for use with a CNN. The reference numerals are used to illustrate where the features of the spectrum occur in the two dimensional array. As illustrated above the four largest peaks in the spectrum (1-4) are all represented by pixels representing red and white in the equivalent original spectrum, and the lowest values of the spectrum are represented by black and purple pixels in the equivalent original spectrum. The image suitable for use with the CNN comprises visual features which correspond to features of the array data. Visual features are features of the two dimensional array which may be detected and/or identified when a CNN is processing a two-dimensional array to obtain CNN output. For example, the image data may be configured so that values for measurements of the sample, e.g. the ordinates, correspond to the features of the image data. The CNNs are trained to operate on such image data.

The processor 110 is configured to convert the array data into spectrometry data so that data representing the spectrum is in a format which is suitable for a CNN to process. In particular, the image data comprises an image in the form of a two dimensional array with a plurality of identifiable features which may be unique to, or identifying for, substances in the sample. Where the data received by the server 100 is not in the selected image format, this conversion by the processor 110 enables data representative of a spectrum to be used with a CNN that has been suitably trained on image data in the selected image format. This conversion process also enables more 'feature-rich' images to be analysed by the CNNs. This may enable a higher accuracy and/or reliability for detecting the presence of the substance of interest in a sample.

The data store 120 comprises executable instructions for at least one CNN. The processor 110 executing the instructions may comprise the processor 110 compiling a program based on the instructions. It may comprise the processor 110 operating a program which operates based on the instructions. It is to be appreciated that any executable instructions may comprise any means for the processor 110 to utilise the functionality of a CNN.

Each of the CNNs comprises a plurality of layers of neurons. Each CNN includes a convolutional layer which is configured to convolve the input image across its height and width. Each CNN may also have a plurality of filtering layers, each of which comprises a plurality of neurons configured to focus on and apply filters to different portions of the image. Neurons in the filtering layers may receive input from all of the neurons in the preceding layer. They may send their output to all of the neurons in a subsequent layer. Each CNN may also include other layers for processing the image such as pooling layers (to introduce non-linearity to the CNN), Rectified Linear Units layer (ReLU) and loss layers.

At each step in the process of analyzing an image using a CNN, e.g., at every neuron, a weighting is applied to each of the inputs. The output of a neuron is dependent on its input, and the weightings applied to its input. It may also be dependent on other factors. Therefore, adjustments to the value of the inputs for a neuron, i.e. a change of their weightings, will result in the value of the output for a neuron changing. The output of each neuron is passed on to a plurality of other neurons. This output may be passed on to all of the neurons in the subsequent layer. Therefore, the input to each one of these neurons in the subsequent layer, and thus their respective outputs, may vary based on a change in the weightings applied to the previous neuron's input. This process may continue through subsequent layers of neurons analyzing the image. Accordingly, the weightings applied to the input of one neuron may have a significant effect on the overall output from an analysis using that CNN. Weightings may be applied to the input for each neuron in the CNN. Each of these weightings may be selected and then modified in response to training of the CNN.

The executable instructions for each CNN may be configured so that there are a finite number of possible outcomes for an analysis using that CNN. In some embodiments, a CNN may be configured so that an analysis of an image using that CNN may comprise determining respective probabilities for each one of these possible outcomes being satisfied. By programming the possible outcomes of a CNN, the CNN can be trained using images for which an expected outcome is known. The instructions for the CNN may then be changed (e.g. at least one weighting is modified) so that repeated use of that CNN (with the modified weightings) would be able to determine the correct outcome for that image.

Training each CNN comprises initially assigning all of the weightings a random value. The processor 110 then operates a CNN on a training image for which the expected outcome is known. Analysis of an image using the CNN will result in the CNN determining a CNN score for the training image. This CNN score is then compared with the expected outcome for that image. Where the CNN score and the expected outcome are different, a backpropagation optimisation method, for example using gradient descent and loss functions is performed on the CNN. This enables identification of how much each different point (neuron) or path (between neurons in subsequent layers) in the network is contributing to determining an incorrect score. The weightings may then be adjusted. For example, to minimise or remove the contribution from neurons which contribute, or contribute the most, to an incorrect determination. The weightings are adjusted so that the CNN would, if operated on the same training image again, produce the expected outcome. Repeated training of the CNN on a large number of images enables the CNN to be trained to identify certain features in images and to attribute those features, or a combination of those features, to one or several outcomes out of the plurality of possible outcomes associated with that CNN.

The server 101 is configured so that the processor 110 may operate a CNN to determine the presence of a substance in a sample. Each CNN is configured and trained so that a possible outcome for an analysis of obtained spectrometry data performed by the CNN comprises a probability that the substance of interest is present in a sample, based on an analysis of an image comprised in the spectrometry data. Accordingly, operating the CNN to analyse an image will result in the CNN determining a probability that the substance of interest is present. Where this probability is greater than a certain threshold value, the processor 110 may be configured to determine that the substance of interest is present in the sample.

Each CNN may be configured to have a plurality of possible outcomes. For instance, each of which may represent the possibility of one substance of interest being present in the sample. Therefore, operating the CNN to analyse an image could produce a plurality of probabilities, wherein each probability concerns the presence of one substance being present in the sample. One CNN may thus be operated to determine the probability of there being each of a plurality of different substances of interest in the sample.

Each CNN is operated on a large number of images of the type described above for the purposes of training the CNN. Each of these images represents a form of spectra data for a sample, and has at least one substance associated therewith which is known to be present in the sample. The CNN is operated on the image to determine an analysis of the image. The outcome of this analysis is to determine whether or not the substance is present in this sample. The outcome may be a probability of a substance being present in the sample. This outcome is compared with the at least one substance which is known to be present in the sample. In the event that analysis with the CNN results in an incorrect determination of the substance of interest being present, the weightings for the CNN are updated. For instance, the updates are in accordance with the manner described above, so that repeated use of that analysis would determine the correct substance being present. This process is repeated with a plurality of different images and a plurality of different compounds associated therewith. Ideally, it is repeated until the CNN consistently and correctly determines the presence of the substances in a sample. The system may be tested on 'test data', which comprises spectrometry data with known substances present, to determine a level of accuracy for the CNN. A CNN may be declared as suitable once it achieves an accuracy threshold or reliability threshold above a threshold percentage.

The server 100 may comprise executable instructions for a plurality of CNNs which have been trained this way. As the initial weightings for a CNN are assigned randomly, a plurality of CNNs could be generated which are trained on the same training images, but which still have different weightings. Therefore, such CNNs have the propensity to produce different results. In addition, other CNNs could be trained using different training images or the same images but in a different order. This approach to training CNNs may result in CNNs which determine slightly different probabilities for the presence of substances, even though they were trained using the same data and their neurons are programmed in the same manner.

The server 100 has been described above as comprising a CNN, or a plurality of CNNs, which are configured to determine the presence of a plurality of substances of interest in a sample. However, it is to be appreciated that the server 100 may comprise executable instructions for a plurality of CNNs. Each CNN being assigned a respective corresponding substance it is configured to determine the presence of in a sample. In which case, each CNN is trained to identify specific substances. For example, a CNN may be programmed with a Boolean outcome for the presence of one substance. Therefore, by analyzing one image with a plurality of such CNNs, a breakdown could be generated for each of the substances the CNNs are trained to detect.

As mentioned above, the outcome of training a CNN results in the CNN developing refined weightings for each of its neurons. For each CNN that is trained, these weightings will be different. For example, different CNNs may focus more heavily on different areas of an image when determining the presence of the substance of interest in the sample. Consequently, distinctive features of one substance may be represented in a region of the image for which one CNN does not focus so heavily, and so may go unnoticed. Conversely, features which are not particularly useful may occur in a region of the image for which one CNN focuses more intently, and so may get more attention than desired.

The processor 110 is configured to operate a first CNN 121 to determine a first analysis for an image. The processor 110 is also configured to apply a mask to that image, and to operate a second CNN to determine a second analysis for that masked image. Applying a mask may comprise reducing the intensity of a portion of the image. For example, where pixel color or intensity is used to represent the value for that pixel, the color/intensity may be altered, e.g. lowered or even zeroed.

The effect of applying such masks is to remove the influence of the masked part of the image when determining the presence of the substance of interest in the sample. The masks applied may be crude and random, such as applying a rectangle to a random portion of the image. Alternatively, the masks may be more sophisticated, and could be designed specifically for possible expected features in the image. For example, masks may be designed to replicate an expected pattern for one substance which may be present in the sample. This may be of use if the CNN is configured to determine the presence of one substance in the sample, but the presence of a characteristic feature of another substance in the spectrometry data influences the CNN when determining whether the one substance it is looking for is present. Accordingly, a mask could be applied to remove the influence of such features. The data store 120 may comprise instructions for a plurality of masks, each of which may be for use when determining the presence of a selected substance of interest. For example, where two spectra may be very similar, apart from the presence of one distinct feature in the spectrum of one of the samples, the masks may be utilised to enable the CNN to determine an analysis with the distinct feature isolated and/or removed. This may enable the CNN to focus more or less on the region of the image which may correspond to that feature of the spectrum.

Figure 4:
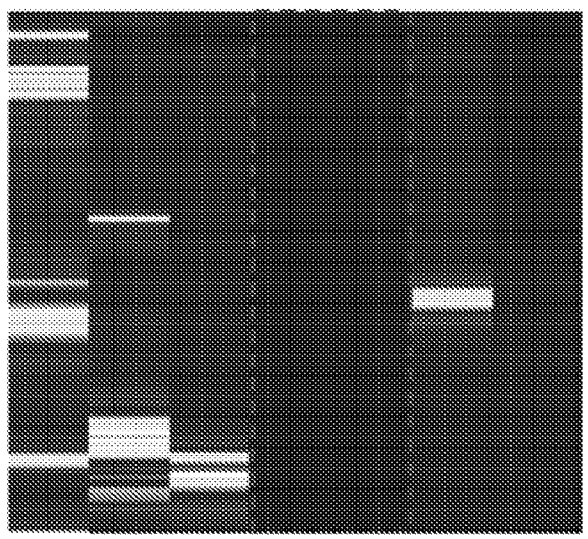
FIG. 4 is a schematic diagram illustrating an example of masks being applied to spectrometry data.
Figure 4:
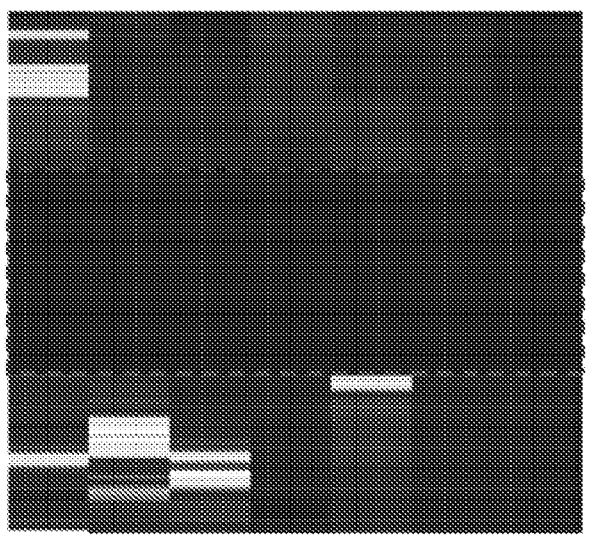
Figure 4:
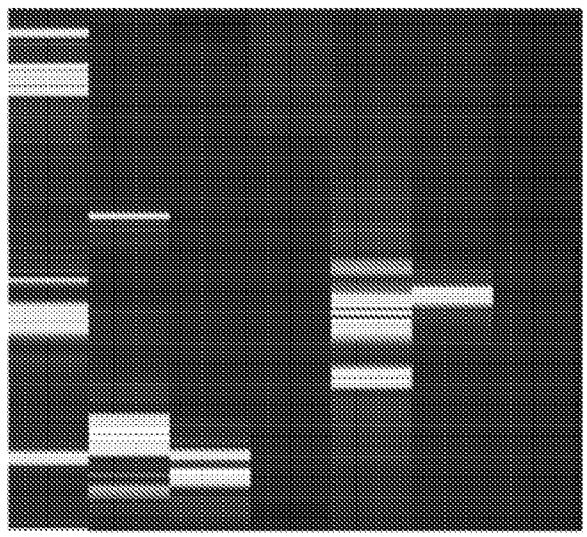

FIG. 4 illustrates an example of masks being applied to an image. The masks are outlined by dashed lines. In this example, the masks are rectangular and applied to arbitrary portions of the spectrum image. The result of applying masks in the illustrated example is that the region covered by the mask is entirely blacked out.

Masks may also be applied during training of the CNN. Here, a training image is analysed by the CNN, and the training image has a mask applied to it. The same expected substances are used as for the image without the mask applied. The effect of this approach may be to train the CNN to trigger neurons to analyse different portions of the image, or to focus more on certain areas of the spectrum. For example, where a substance has one very distinctive feature in its spectrum, the CNN may be trained, using appropriate masks, to focus more or less on this feature when determining that the substance is present in a sample.

Application of the masks may be by the processor 110 modifying pixel values for a region of the image. In some embodiments, a CNN may be programmed to have functionality for masking as part of the functionality of a plurality of its neurons. For instance, this may be implemented using at least one of the filters of the CNN. In some embodiments, applying the mask may comprise producing another image based on both the original image and a mask to be applied.

The processor 110 may be configured to implement a voting ensemble, which may improve the reliability and accuracy of the system. Use of a voting ensemble comprises multiple analyses being performed. This may involve: using multiple different CNNs to analyse an image, using one CNN to repeatedly analyse an image with different masks being applied to the image, or some combination of the two. The outcome of a CNN analysis will include determining a probability that a substance is present in a sample. Therefore, when determining a plurality of analyses for an image, the result will be a corresponding plurality of probabilities. These probabilities could be used to determine the presence of a substance in a sample in a plurality of different ways. For example, an average of the probabilities may be taken, and if the average probability is above a threshold value then it is determined that the substance of interest is present in the sample.

In another example, a voting scheme may be used. In this example, if a sufficient number of the analyses determine that the substance of interest is present in the sample, then it will be determined that the substance is present. An extension of this voting scheme is that CNNs or masks may be used which are tailored for determining the presence of certain substances. The voting scheme may include weightings so that the outcome of one CNN may be valued more than another. Accordingly, when a CNN or mask is used which is tailored specifically towards identifying whether or not a certain substance is present in a sample, the probability determined by this CNN/mask may be attributed a high weighting when it is used to determine whether or not the certain substance is present in the sample.

The voting scheme may not use weightings at all. As mentioned above, different CNNs may determine different probabilities for the same image, and also a CNN may determine different probabilities for an image when analyzing it with different masks applied. By using the voting scheme, fluctuations in the overall probability determined for the presence of a substance of interest in a sample may be reduced.

Figure 5:
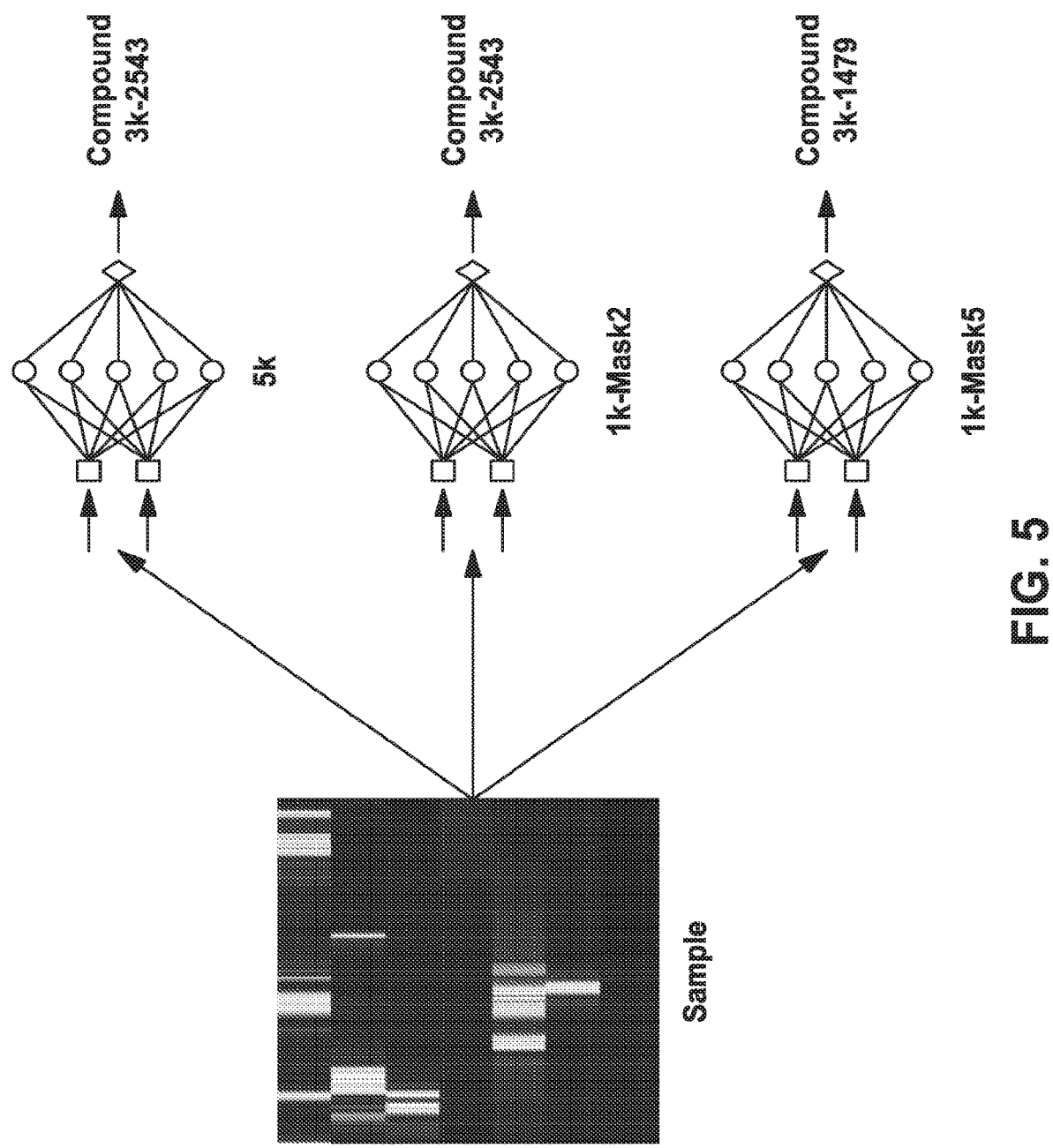
FIG. 5 is a schematic diagram illustrating an example of a voting ensemble used in accordance with an example embodiment of the present disclosure.

FIG. 5 depicts a voting scheme being applied. As can be seen, the result of the analysis using the 1k-Mask5 results in a different compound being determined to be in the sample when compared to the other analyses. Using the voting ensemble, this result is nullified and the compound 3k-2543 is instead determined to be present as more analyses determined that to be the case.

A further extension of the voting ensemble is that a user may be presented with all of the possible substances determined to be in the sample. They may then be able to re-analyse the image to look for a substance of interest which may have been identified as possibly being in the sample. Thus, the output of every CNN could be considered.

Whilst it has been described above that each individual analysis comprises only determining one probability or determination for the presence of a substance of interest in the sample, it is to be appreciated that this may comprise more than one. For example, when working with Ion Mobility Spectrometry data, two analyses may be performed: one for analysis of positive mode data and one for analysis of negative mode data. Alternatively, each analysis (e.g. first and second analysis) may comprise a plurality of analyses and the determination is based on each of the analyses.

It is to be appreciated that training of the CNNs, and the updates to the weightings have been described as being immediately following training being performed, there may be a delay. For example, updates may be applied in bulk at later time, or during a certain time window, such as when the server and/or detection device is least busy.

It is to be appreciated in the context of this disclosure that communication between any of the devices and the server 100 may occur in a number of ways. The communication interface of the devices described herein may comprise any wired or wireless communication interface such as WI-FI (RTM), Ethernet, or direct broadband internet connection, and/or a GSM, HSDPA, 3GPP, 4G or EDGE communication interface.

Messages described herein may comprise a data payload and an identifier (such as a uniform resource indicator, URI) that identifies the resource upon which to apply the request. This may enable the message to be forwarded across the network to the device to which it is addressed. Some messages include a method token which indicates a method to be performed on the resource identified by the request. For example these methods may include the hypertext transfer protocol, HTTP, methods "GET" or "HEAD". The requests for content may be provided in the form of hypertext transfer protocol, HTTP, requests, for example such as those specified in the Network Working Group Request for Comments: RFC 2616. As will be appreciated in the context of the present disclosure, whilst the HTTP protocol and its methods have been used to explain some features of the disclosure other interact protocols, and modifications of the standard HTTP protocol may also be used.

As described herein, network messages may include, for example, HTTP messages, HTTPS messages, Internet Message Access Protocol messages, Transmission Control Protocol messages, Internet Protocol messages. TCP/IP messages. File Transfer Protocol messages or any other suitable message type may be used.

Any processors used in the server and/or in the detection device (and any of the activities and apparatus outlined herein) may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store 120 of the server (and any of the apparatus outlined herein).

The first CNN output may thus be based on unmasked spectrometry data, e.g. indicative of the complete original measurement data, whereas the second CNN output is based on masked spectrometry data. This combination provides more than one perspective for spectrometry data analysed by the CNN. The first CNN output may be based on the spectrometry data which may include features which are not included in the masked data used for obtaining the second. CNN output. Attributes associated with the processed data may therefore differ between the first CNN output and the second CNN output. Use of both CNN outputs may therefore provide a more balanced view of the spectrometry data. For instance, this may prevent features in an item of spectrometry data skewing overall results for the determination of the substance of interest being present in the sample. As one example, this my reduce false positives where one feature present in an item of spectrometry data leads a CNN to determine that the substance is present, but wherein upon processing the data with a mask covering this feature, the CNN determines (correctly) that the substance is not present. Such situations may occur where substances are associated with one particular feature, and systems for determining the presence of the substance in a sample are overly reliant on the presence of the particular feature.

Processing images using a CNN comprises providing image data to a CNN which processes the image data. The CNN is configured to process the image data based on a plurality of operations performed by neurons of the CNN. Input for the operations is scaled using a plurality of weightings. Output from the operations in one layer of the CNN may be passed on, as input, to neurons in a subsequent layer of the CNN. Based on a weighted combination of the outputs from all of the neurons, the CNN may determine attributes for the image data. Based on the attributes, the device may determine the presence of the substance of interest in the sample.

A two-dimensional array of spectrometry data may provide an 'image'. Different portions of this image may have different attributes associated therewith. This two-dimensional array of spectrometry data may be representative of one or more arrays (e.g. vectors) of data obtained from a sample, e.g. by spectrometry measurements. Array data may comprise vector data. The array data may be generated based on measurements of the sample. The measurements comprising a spectrometry signal measured over a signal range. Array data comprises a one-dimensional set of signal amplitudes at each of a set of points in that measurement range. For instance, each of the signal amplitudes may be an ordinate corresponding to a point in the measurement range (an abscissa). The point in the measurement range may therefore be the independent variable, and the signal amplitude may therefore be the dependent variable. This array data may therefore comprise an association between each of a plurality of signal amplitudes (values for the dependent variable) and a respective corresponding point in the measurement range (value for the independent variable). For example, array data obtained using a mass spectrometer may comprise signal amplitudes representing a number of counts of received ions corresponding to a point in the measurement range which represents a mass to charge ratio. Obtaining the spectrometry data may comprise a conversion of the array data (e.g. a vector) into the image data, e.g. by arranging it into a two-dimensional array. Obtaining the spectrometry data based on the array data may comprise converting a one-dimensional set of data (e.g. a vector) into a two-dimensional array, e.g. arranging it in the form of an 'image' in which the 'line' of values provided by the vector may be folded over into the rows of elements in the array. Each of the signal amplitudes in the array data comprises a one-dimensional measurement value. Obtaining the spectrometry data comprises transforming each one-dimensional measurement value so that it is represented by a two-dimensional region in the image. Each of the points in the measurement range comprises a one-dimensional value (e.g. a single scalar value). Obtaining the spectrometry data comprises transforming each of these one-dimensional values so that the location, in the two-dimensional array, of the two-dimensional region corresponding to the measurement value for that point in the measurement range represents the one-dimensional value for the point in the measurement range.

The two dimensional array may comprise an image, for example of dimensions a×b pixels. It may be structured so that the range of measurement values for the sample is reflected in the structure of the array. The measurement values may be equivalent to the amplitude of a signal. For instance, each feature of the image data may represent amplitude of the signal. The location of a feature in the image data may represent a value for the independent variable (e.g. the abscissa) which the amplitude of the signal respectively corresponds to.

Processing the spectrometry data may comprise processing an image, using a CNN, to obtain at least one attribute for the image. This at least one attribute is used to determine the presence of the substance of interest in the sample. The determination is based on both the first CNN output and the second CNN output, and the respective attributes there determined. This may comprise a combination or selection of attributes from both analyses.

In an embodiment, the device is configured to apply the mask to the spectrometry data by reducing the intensity of a portion of the spectrometry data. Reducing the intensity may be configured so that processing the spectrometry data is based on a lower contribution from that portion of the spectrometry data. In this context, lower contribution relates to features in that portion being less prominent, and thus the determination of substance of interest being present will be influenced less by features present in that portion of the spectrometry data. This may enable determination of the substance of interest to be based less heavily on certain regions of the spectrometry data, such as localised regions of the two dimensional array. Thus the determination may be less reliant on certain features or portions of the spectrometry data.

In an embodiment, the device is configured to apply the mask to the spectrometry data by zeroing the intensity of a portion of the spectrometry data. Zeroing the intensity comprises setting a value for a property of the intensity in that region of the spectrometry data to zero. For example, the intensity property may comprise one of hue, colorfulness, chroma, saturation, lightness and brightness. This may provide a greater difference between the first CNN output and the second CNN output, which may enable the presence of the substance of interest to be determined allowing for a dependence or sensitivity of the determination to the portion of the spectrometry data.

In an embodiment, the processor is configured to determine a probability that the substance of interest is present in the sample based on the first CNN output and the second CNN output. An attribute from the first and/or second CNN output may be a probability that the substance of interest is present in the sample. Providing a probability may enable a number of actions to be taken as a result of the determination. A first action may be taken in the event that a value for the probability is in a first range, and a second action may be taken in the event that a value for the probability is in a second range. In the event that the probability is near a change in ranges, an alert may be generated for an operator using the device who may make a decision on a course of action based on this probability.

In an embodiment, the processor is configured to determine that the substance of interest is present in the event that the probability is greater than a threshold value. The threshold may represent a probability determined to be statistically significant. This significance may be for the overall presence of the substance of interest being present; it may be to warrant a further action being taken; it may be a value set by an operator of the system for example based on local protocols.

In an embodiment, determining if the substance of interest is present is based on a first probability based on the first CNN output and a second probability based on the second CNN output. The first and second probability may be combined, for example averaged, and the presence of the substance of interest determined based on the combined probability. The device may be configured so that in the event that the device determines that one of the probabilities is above a threshold value, the substance of interest is determined to be present, regardless of the value of the second probability. There may be interdependence between the two such that a value for the first probability may be sufficiently high enough to offset a relatively low second probability. This may enable the device to determine the presence of the substance of interest with greater reliability.

In an embodiment, the processor is configured to determine that the substance of interest is present in the sample in the event that a threshold number of the CNN outputs indicate that it is. The device may obtain more than two CNN outputs; the device may obtain a plurality of CNN outputs; for example: three, four, five, six, ten. These may be performed each by one CNN. They may be performed each by a different CNN. They may be performed by some combination of the two. A plurality of CNN outputs may enable a voting ensemble to be used. In which, the substance of interest may be determined to be present if a sufficient number of the CNN outputs provide an indication that it is. A substance may be determined to be present in the event that a greater number of CNN outputs indicate that the substance is present than for any other substance. This may enable the device to determine the presence of the substance of interest with greater reliability. This may enable the system to use more masks or more significant masks in at least some of the analyses. Benefits associated with masked data may therefore apply to a greater extent.

In an embodiment, the spectrometry data comprises at least one of: Mass spectrometry data, Raman spectrometry data, Optical spectrometry data, including Infrared, Ultraviolet and visible light, Fourier Transform Infrared spectrometry, data, Ion Mobility spectrometry data, Radiological spectrometry data, Biological Agent spectrometry; data. The spectrometry data may be received from any suitable spectrometer or spectrometry, gathering device. The CNNs may be trained to specific source of spectrometry data. This may enable increased accuracy for detection from a known source of spectrometry data. The CNNs may be trained to operate on a number of different types and/or combinations of spectrometry data.

In an embodiment, the device comprises a spectrometer from Which it is configured to obtain array data representative of the sample. This may comprise directly obtaining measurement data from the spectrometer. It may comprise receiving processed data from the spectrometer, wherein processed data comprises measurement data which has been processed in some manner by the device. The device may receive the array data from a plurality of spectrometers. This may enable a feedback system from a plurality of sources, which could be used to further train the CNN.

In an embodiment, obtaining spectrometry data comprises obtaining array data representative of the sample.

In an embodiment, the device is configured to transform the array data representative of the sample into spectrometry data arranged in at least one two dimensional array. Transforming the array data may comprise processing a series of e.g. numerical results, into a two dimensional array such as image data. This may enable spectrometers (such as a spectrometer comprised within the device) to communicate measurement or array data directly to the device without the need for a system operable to process such data to produce spectrometry data. In some instances, spectrometry data may be very feature rich and is associated with very large file sizes. In such instances, communication of array data between a spectrometer and the device may be quicker when array data is sent.

In an embodiment, the processor is configured to perform a raster image process to transform array data into spectrometry data. A raster image process comprises: interpreting array data; rendering the array and screening the spectrometry data. The raster image process may process the array data in accordance with a protocol so that the output spectrometry data is of a unified file type and/or the features of the array data are represented in a selected way in the spectrometry data. For instance, the process may be controlled so that selected portions of the array data are translated into selected portions of the spectrometry data (the two dimensional array). The processor performing the raster image process may ensure that the CNNs operate on spectrometry data of a uniform type. This may remove any variations in the type of spectrometry data generated by different spectrometers (or other devices).

In an embodiment, operating the first one of the CNNs to process spectrometry data to obtain a CNN output comprises detecting at least one feature in the spectrometry data which corresponds to a known feature associated with known spectrometry data. Corresponding may not require an exact match with known spectrometry data, it may comprise identifying a relationship (whether scaled or not) or an indication of a similarity. The feature of the image may comprise any region or any change (or rate of change) between regions of the image from Which the CNN may be configured to determine a correspondence between known spectrometry data and the spectrometry data. Known spectrometry data may comprise spectrometry data and its associated results from processing the spectrometry data when training the CNN. The CNN is configured to assimilate features or characteristics of a new item of spectrometry data and/or the analysis thereof with features or characteristics of an item of spectrometry data used to train the CNN and/or an analysis thereof. Based on the data used to train the CNN (which is associated with a known outcome), the CNN will have 'learned' to assimilate some attributes of such spectrometry data to an outcome for that CNN output. This trained assimilation may influence the CNN output for a new item of spectrometry data.

In an embodiment, the processor is operable to update the executable instructions for each of the plurality of CNNs. This may comprise updating the weightings or any numerical scaling factors for the CNN. The processor may thus implement the results from any training in the executable instructions for the CNN. In the event that CNN output indicates (e.g., an audio and/or visual message or alert) that a substance of interest is present, and further testing determines that the substance of interest is not present, the processor may update the executable instructions so that the CNN 'learns' from the incorrect determination.

In an embodiment, the processor is configured to update the executable instructions for a CNN in response to operating that CNN to process masked data from a sample where the presence of the substance of interest is known. The CNN may therefore be trained based on masked data, and may therefore enable the provision of a more accurate and/or reliable CNN when analyzing masked data.

In an embodiment, the first one of the plurality of CNNs and the second one of the plurality of CNNs are the same. In an alternative embodiment, the first one of the plurality of CNNs and the second one of the plurality of CNNs are different. The device may be configured to process the spectrometry data a plurality of times, and the plurality comprises a plurality from a first CNN and at east one from a second CNN In an embodiment, the device is configured to apply a first weighting to a first probability determined based on the first CNN output and a second weighting to a second probability determined based on the second. CNN output. An overall probability is determined based on both the first and second probabilities and the first and second weightings. This may enable the device to control the relative influence of any analysis of the masked data to the overall determination of the substance of interest being present in the sample.

In an embodiment, the device may determine a total analysis, which comprises determining an overall probability for the presence of each of a plurality of substances and determining, based on each of the plurality of overall probabilities, which substances are present in the sample. This may enable one CNN to be used which may detect a plurality of substances.

In an embodiment, the device is configured to determine that a substance is present in the sample in response to determining that a second threshold number of the respective corresponding probabilities are greater than a third threshold value. This may enable a voting ensemble scheme to be used, in which if a threshold number of the CNN outputs (second threshold number) indicate that the substance is present (associated with a probability greater than the third threshold number), then the substance is determined to be present. This may enable the provision of a plurality of CNNs, some of which may be very specialised or unique, wherein the device may determine the presence of the substance of interest without reliance on any one of the CNNs determining the substance to be present. The indicator, for example, may be in the form of an audio and/or visual message or alert).

In an embodiment, the device is configured to determine the second threshold number based on the number of the plurality of CNN outputs. For instance, the second threshold number may correspond to a selected proportion of the total number of analyses revealing that the substance is present in the sample.

In an embodiment, obtaining spectrometry data comprises partitioning spectrum data. (e.g. array data) into a plurality of portions wherein the spectrometry data comprises a plurality of rows and/or columns, each of which represents a portion of the spectrum data. This may enable a larger spectrum to be transformed into a standardised image format for use by the CNNs, e.g. a square.

In an embodiment, the device is configured to determine the mask to be applied based on the spectrometry data. This may enable selected masks to be applied to selected types of spectrometry data. This may enable the provision of more specific and focused analyses which are directed towards detecting the presence of specific substances of interest in specific samples for a specific type of spectrometry data.

In an embodiment, the device is configured to apply a periodic mask to the spectrometry data so that the intensity is reduced for a plurality of portions of the spectrometry data, and the portions are spaced apart by a selected period. The selected period may be constant or it may be a variable depending on the spectrometry data. This may enable one mask to be used which masks more than one occurrence of a periodic feature in spectrometry data with a single mask.

In an embodiment, the device is configured to obtain spectrometry data wherein the intensity and/or color for pixels in a region of the spectrometry data correspond to a point in the array data and indicate the value for that point.

In an embodiment, the device is configured to obtain spectrometry data wherein the change in intensity and/or color over a region of the spectrometry data corresponds to a change in value for the corresponding points in the array data.

Processing the spectrometry data to obtain a first CNN output may comprise determining a first analysis of the spectrometry data. Processing the masked data to obtain a second CNN output may comprise determining a second analysis of the masked data.

In an aspect there is provided a server for analyzing spectrometry data to determine the presence of a substance of interest in a sample. The server comprises: a data store comprising executable instructions for at least one convolutional neural network, CNN, configured to process images; and a processor coupled to the data store and configured to execute the instructions to operate the at least one CNN. The server is configured to: (i) obtain spectrometry data, wherein the spectrometry data is arranged in at least one two dimensional array; (ii) operate a first one of the CNNs to process the spectrometry data to obtain a first CNN output; (iii) apply a mask to the spectrometry data to obtain masked data; (iv) operate a second one of the CNNs to process the masked data to obtain a second CNN output; and (v) determine if the substance of interest is present in the sample based on both the first CNN output and the second CNN output.

In an aspect there is provided a system for detecting the presence of a substance of interest in a sample. The system comprises: a spectrometer; and a server for analyzing spectrometry data, wherein the server comprises a processor configured to operate at least one convolutional neural network, CNN, configured to process images. The spectrometer is configured to obtain array data representative of the sample, and the server is configured to obtain spectrometry data for the sample based on the array data. In response to obtaining the spectrometry data, the server is configured to: (i) operate a first CNN to process the spectrometry data to obtain a first CNN output; (ii) apply a mask to the spectrometry data to obtain masked data; and (iii) operate a second CNN to process the masked data to obtain a second CNN output. The system is configured to determine if the substance of interest is present in the sample based on both the first CNN output and the second CNN output.

In an embodiment, the spectrometry data is arranged in at least one two dimensional array.

In an embodiment, the server is configured to obtain the array data from the spectrometer and to transform the array data into spectrometry data.

In an aspect there is provided a detection device for communication with a server for analyzing spectrometry data using convolutional neural networks, CNNs, configured to process images, to determine the presence of a substance of interest in a sample. The device comprises a communications interface configured to enable the transmission and receipt of messages between the device and the server. The device is connectable with a spectrometer to obtain array data representative of the sample. The device is configured to: send a first message to the server, the first message comprising data for transferal to spectrometry data for use by a CNN, the data for transferal being based on the array data; receive a second message from the server, the second message comprising results indicative of a CNN analysis of the spectrometry data; and provide an indication (e.g., an audio and/or visual message or alert) of the presence of the substance of interest in the sample based on the second message.

In an aspect there is provided a computer-implemented method of analyzing spectrometry image to determine the presence of a substance of interest in a sample. The method comprises: obtaining spectrometry data, wherein the spectrometry data is arranged in at least one two dimensional array; operating a first convolutional neural network, CNN, to process the spectrometry data to obtain a first CNN output; applying a mask to the spectrometry data to obtain masked data; operating a second CNN to process the spectrometry data to obtain a second CNN output; and determining if the substance of interest is present in the sample based on both the first CNN output and the second CNN output.

In an aspect there is provided a non-transitory computer readable medium comprising computer program instructions configured to program a processor to perform any method described or claimed herein.

The server 100, including some or all of its components, can operate under computer control. In embodiments, a controller can include a processor, a memory, and a communications interface. The processor provides processing functionality for at least the controller and can include any number of processors, micro-controllers, circuitry, field programmable gate array (FPGA) or other processing systems, and resident or external memory for storing data, executable code, and other information accessed or generated by the controller. The processor can execute one or more software programs embodied in a non-transitory computer readable medium that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The memory can be an example of tangible, computer-readable storage medium that provides storage functionality to store various data and or program code associated with operation of the controller, such as software programs and/or code segments, or other data to instruct the processor, and possibly other components of the server 100, to perform the functionality described herein. Thus, the memory can store data, such as a program of instructions for operating the server 100 (including its components), and so forth. It should be noted that while a single memory is described, a wide variety of types and combinations of memory (e.g., tangible, non-transitory memory) can be employed. The memory can be integral with the processor, can comprise stand-alone memory, or can be a combination of both.

Some examples of the memory can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, remove e.g., server and/or cloud) memory, and so forth. In implementations, memory can include removable integrated circuit card (ICC) memory, such as memory provided by a subscriber identity module (SIM) card, a universal subscriber identity module (USIM) card, a universal integrated circuit card (UICC), and so on.

The communications interface (e.g., network 50) can be operatively configured to communicate with components of the one or more detection devices 10, 20 and/or the server 100. For example, the communications interface can be configured to transmit data for storage by the server 100, retrieve data from storage in the server 100, and so forth. The communications interface can also be communicatively coupled with the processor to facilitate data transfer between components of the server 100 and the processor. It should be noted that while the communications interface is described as a component of controller, one or more components of the communications interface can be implemented as external components communicatively coupled to the server 100 or components thereof via a wired and/or wireless connection. The server 100 or components thereof can also include and/or connect to one or more input/output (I/O) devices (e.g., via the communications interface), such as a display, a mouse, a touchpad, a touchscreen, a keyboard, a microphone (e.g., for voice commands) and so on.

The communications interface and/or the processor can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface can be configured to communicate with a single network or multiple networks across different access points. In a specific embodiment, a communications interface can transmit information from the controller to an external device (e.g., a cell phone, a computer connected to a WiFi network, cloud storage, etc.). In another specific embodiment, a communications interface can receive information from an external device (e.g., a cell phone, a computer connected to a WiFi network, cloud storage, etc.).

Generally, any of the functions described herein can be implemented using hardware (e.g., fixed logic circuitry such as integrated circuits), software, firmware, manual processing, or a combination thereof. Thus, the blocks discussed herein generally represent hardware (e.g., fixed logic circuitry such as integrated circuits), software, firmware, or a combination thereof. In the instance of a hardware configuration, the various blocks discussed herein may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed herein represent executable instructions (e.g., program code) that perform specified tasks when executed on a processor. These executable instructions can be stored in one or more tangible computer readable media. In some implementations, the entire system, block, or circuit may be implemented using its software or firmware equivalent. In other implementations, one part of a given system, block, or circuit may be implemented in software or firmware, while other parts are implemented in hardware.

It will be appreciated from the discussion above that the embodiments shown in the Figures are merely examples, and include features which may be generalised, removed or replaced as described herein and as set out in the claims. With reference to the drawings in general, it will be appreciated that schematic functional block diagrams are used to indicate functionality of systems and apparatus described herein. For example the functionality provided by the data store may in whole or in part be provided by a processor having one more data values stored on-chip. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit. For instance, the functionality of the server has been described in detail however it is to be appreciated that the same functionality may be performed by the detection device for embodiments in which the detection device is configured to analyse spectrometry data using the CNNs.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in not-transitory form. Hardware includes computers, handheld devices, programmable processors, general purpose processors, application specific integrated circuits, ASICs, field programmable gate arrays, FPGAs, and arrays of logic gates.

Other examples and variations of the disclosure will be apparent to the skilled addressee in the context of the present disclosure.

What is claimed is:

1. A server for analyzing spectrometry data to determine the presence of a substance of interest in a sample, the server comprising:
    a data store comprising executable instructions for at least one convolutional neural network (CNN) configured to process images; and
    a processor coupled to the data store and configured to execute the instructions to operate the at least one CNN;
    wherein the server is configured to:
        obtain spectrometry data, wherein the spectrometry data is arranged in at least one two dimensional array;
        operate a first one of the convolutional neural networks (CNNs) to process the spectrometry data to obtain a first CNN output;
        apply a mask to the spectrometry data to obtain masked data;
        operate a second one of the CNNs to process the masked data to obtain a second CNN output; and
        determine if the substance of interest is present in the sample based on both the first CNN output and the second CNN output.

2. The server of claim 1, wherein the device is configured to apply the mask to the spectrometry data by reducing the intensity of a portion of the spectrometry data.

3. The server of claim 1, wherein the device is configured to apply the mask to the spectrometry data by zeroing the intensity of a portion of the spectrometry data.

4. The server of claim 1, wherein the processor is configured to determine a probability that the substance of interest is present in the sample based on the first convolutional neural network (CNN) output and the second CNN output.

5. The server of claim 4, wherein the processor is configured to determine that the substance of interest is present in the event that the probability is greater than a threshold value.

6. The server of claim 4, wherein determining if the substance of interest is present is based on a first probability based on the first convolutional neural network (CNN) output and a second probability based on the second CNN output.

7. The server of claim 5, wherein the processor is configured to determine that the substance of interest is present in the sample in the event that a threshold number of convolutional neural network (CNN) outputs indicate that it is.

8. The server of claim 1, wherein the spectrometry data comprises at least one of: Mass spectrometry data, Raman spectrometry data, Optical spectrometry data, Fourier Transform Infrared spectrometry data, Ion Mobility spectrometry data, Radiological spectrometry data, Biological Agent spectrometry data.

9. The server of claim 1, wherein obtaining spectrometry data comprises obtaining array data representative of the sample.

10. The server of claim 9, wherein the device is configured to transform the array data representative of the sample into spectrometry data arranged in at least one two dimensional array.

11. The server of claim 10, wherein the processor is configured to perform a raster image process to transform array data into spectrometry data.

12. The server of claim 1, wherein operating the first one of the convolutional neural networks (CNNs) to process the spectrometry data comprises detecting at least one feature in the spectrometry data which corresponds to a known feature associated with known spectrometry data.

13. The server of claim 1, wherein the processor is operable to update the executable instructions for each of the plurality of convolutional neural networks (CNNs).

14. The server of claim 13, wherein the processor is configured to update the executable instructions for a convolutional neural network (CNN) in response to operating that CNN to process the masked data from a sample where the presence of the substance of interest is known.

15. The server of claim 1, wherein the spectrometry data is in the form of image data.

16. A system for detecting the presence of a substance of interest in a sample, the system comprising:
    a spectrometer; and
    a server for analyzing spectrometry data, wherein the server comprises a processor configured to operate at least one convolutional neural network (CNN) configured to process images;
    wherein the spectrometer is configured to obtain array data representative of the sample, and the server is configured to obtain spectrometry data for the sample based on the array data;

in response to obtaining the spectrometry data, the server is configured to:
  operate a first CNN to process the spectrometry data to obtain a first CNN output;
  apply a mask to the spectrometry data to obtain masked data; and
  operate a second CNN to process the masked data to obtain a second CNN output;
wherein the system is configured to determine if the substance of interest is present in the sample based on both the first CNN output and the second CNN output.

17. The system of claim 16, wherein the spectrometry data is arranged in at least one two dimensional array.

18. The system of claim 17, wherein the server is configured to obtain the array data from the spectrometer and to transform the array data into spectrometry data.

19. The system of claim 16, wherein the spectrometry data is in the form of image data.

\* \* \* \* \*